United States Patent [19]

Lai et al.

[11] Patent Number: 5,408,004
[45] Date of Patent: Apr. 18, 1995

[54] POLYOLEFIN BLENDS AND THEIR SOLID STATE PROCESSING

[75] Inventors: Shih-Yaw Lai, Sugar Land; Morris S. Edmondson, Alvin, both of Tex.

[73] Assignee: The Dow Chemical Company, Midland, Mich.

[21] Appl. No.: 107,482

[22] Filed: Aug. 17, 1993

[51] Int. Cl.⁶ .................... C08L 23/04; C08L 23/10; C08J 5/00
[52] U.S. Cl. ................................. 525/240; 525/198; 264/331.17; 264/322
[58] Field of Search ................ 525/198, 240; 264/322, 264/331.7

[56] References Cited

U.S. PATENT DOCUMENTS

| | | | |
|---|---|---|---|
| 3,645,992 | 2/1972 | Elston | 526/348.6 |
| 3,739,052 | 6/1973 | Ayres et al. | |
| 3,947,204 | 3/1976 | Ayres et al. | 425/383 |
| 3,995,763 | 12/1976 | Ayres et al. | 220/74 |
| 4,005,967 | 2/1977 | Ayres et al. | 425/326 |
| 4,014,956 | 3/1977 | Smith et al. | 260/853 |
| 4,107,243 | 8/1978 | Stearns et al. | 264/13 |
| 4,115,499 | 9/1978 | Salyer et al. | 264/122 |
| 4,161,502 | 7/1979 | Wessling et al. | 264/119 |
| 4,352,766 | 10/1982 | Bradley et al. | 264/45.5 |
| 4,542,886 | 9/1985 | Yoshimura et al. | 264/22 |
| 4,607,797 | 8/1986 | Enikolopow et al. | 241/23 |
| 4,981,760 | 1/1991 | Naito et al. | 428/523 |
| 5,001,206 | 3/1991 | Bashir et al. | 526/352 |
| 5,028,633 | 7/1991 | Ohno et al. | 514/778 |
| 5,028,663 | 7/1991 | Chung | 525/198 |
| 5,091,133 | 2/1992 | Kobayashi et al. | 264/119 |
| 5,166,268 | 11/1992 | Ficker | 525/198 |
| 5,206,075 | 4/1993 | Hodgson | 525/240 |
| 5,210,142 | 5/1993 | Kale et al. | 525/240 |

FOREIGN PATENT DOCUMENTS

| | | | |
|---|---|---|---|
| 351189 | 1/1990 | European Pat. Off. | C08F 210/16 |
| 572034 | 12/1993 | European Pat. Off. | C08F 210/02 |
| 590739 | 4/1994 | European Pat. Off. | C08L 23/04 |
| 53-75278 | 7/1978 | Japan . | |
| WO93/13143 | 7/1993 | WIPO | C08F 10/02 |

OTHER PUBLICATIONS

Schwank—Selected Applications for CGCT Polymers—Sep. 1992, Paper presented at SPO '92.

Pawloski and Raspor, "Articles with Improved Properties Via Solid Phase Forming", Conference Proceedings for the Society of Plastics Engineers, Inc., 43d Annual Technical Conference, Washington, D.C., Apr. 29–May 2, 1985.

Capaccio, et al., "The Drawing Behavior of Linear Polyethylene. I. Rate of Drawing as a Function of Polymer Molecular Weight and Initial Thermal Treatment", J. Polym. Sci., vol. 14, 1641-1658 (1976).

Hidehiko and Kuriyama, "Mechanical Relaxations in τ-Ray-Polymerized Polyethylene", J. Polym. Sci., vol. 14, 1659-1669 (1976).

Cansfield, et al., "The Preparation of Ultra-High Modulus Polypropylene Films and Fibres", Polymer Eng. and Sci., vol. 16, No. 11, 721-724 (1976).

Hope, et al., "Hydrostatic Extrusion of Linear Polyethylene in Tubular and Non-Circular Sections", Poly. Eng. and Sci., vol. 20, No. 8, 540-545, (1980).

Gibson, et al., "Hydrostatic Extrusion of Linear Polyethylene: Effects of Molecular Weight and Product Diameter", J. Poly. Sci., vol. 16, 2015-2030 (1978).

Coffman, "Stretch-forming: a simple process with a lot of potential", Plastics Engineering, 19-21 (Aug., 1977).

Coates, "Hydrostatic Extrusion of Polyoxymethylene", J. Polym. Sci., vol. 16, 2031-2047 (1978).

(List continued on next page.)

Primary Examiner—Carman J. Seccuro, Jr.

[57] ABSTRACT

Polyolefin blends characterized by melting and crystallization curves which exhibit either two distinct melt regions, or wherein one component of the blend has a low softening temperature relative to the individual components of the blend, provide an unusually wide window for solid state processing. The solid state processing characteristics of these blends are independent of the manner in which the blends are formulated, e.g. mechanical mixing, solvent dispersion, and the like.

6 Claims, No Drawings

OTHER PUBLICATIONS

Bigg, "A Review of Techniques for Processing Ultra-High Modulus Polymers", Polym. Eng. and Sci., vol. 16, No. 11, 725–734 (1976).

Bigg, et al., "High Modulus Semi-Crystalline Polymers by Solid State Rolling", Polym. Eng. Sci., vol. 22, No. 1, 27–33 (1982).

Krjutchkov, et al., "Solid State Extrusion of Semicrystalline Polymers", Polymer Composites, vol. 7, No. 6, 413–420 (Dec., 1986).

International Search Report, dated Nov. 11, 1994, issued by the EPO acting as the International Searching Authority in PCT/US94/08943.

Ciferri and Ward, Ultra High Modulus Polymers, Applied Science Publ., London (1979).

Krjutchkov, Polymer Composite, vol. 7, #6, pp. 413–420 (1986).

POLYOLEFIN BLENDS AND THEIR SOLID STATE PROCESSING

BACKGROUND OF THE INVENTION

This invention relates to polyolefin blends. In one aspect, the invention relates to polyolefin blends suitable for solid state processing while in another aspect, the invention relates to particular blends of various polyethylenes. In still another aspect, the invention relates to polyolefin blends characterized by melting and crystallization curves exhibiting either two distinct melt regions, or wherein one component has a softening point lower than that of a conventional polyolefin, either technique of which provides an unusually wide window for solid state processing.

While the field of metal forming offers a wide variety of solid state processing, e.g. stamping, forging, rolling, extrusion, etc., the solid state processing of semicrystalline polymers is much more limited. To process a thermoplastic in the solid state, typically the processing temperature is maintained at just a few degrees below the melting point of the polymer. If the processing temperature is above the melting point of the polymer, then the processing is simply a melt extrusion. At temperatures considerably below the melting point of the polymer, the polymer is essentially a solid and its deformation requires a tremendous amount of pressure (often in excess of one million psi). Such enormous pressures make large deformations very difficult, and result in a relatively low production rate and a generally energy inefficient process. Moreover, since the processing temperature is the most critical parameter in solid state processing, this technique has been limited to those polymers and polymer blends with relatively wide (e.g. at least about 20 degrees on the Celsius scale) ranges between their softening and melting temperatures. Since this temperature range is relatively narrow for conventional polyolefins and their blends, these materials have not been the subject of extensive, commercial-scale solid state processing.

Despite their relatively narrow processing temperature window, the sheer commercial scale of the polyolefin market has generated considerable interest in applying this technique to polyolefins. The potential benefits to be gained include energy efficiency, speed, and scrap reduction. Ciferri and Ward in "Ultra High Modulus Polymers", *Applied Science Publications*, London (1979), teach that the extrusion of polymers below the melting point is a promising method of producing highly oriented materials. Krjutchkov, et al. in *Polymer Composite*, Vol. 7, No. 6, pp. 413-420 (1986), disclosed the detailed investigations of the dynamics of solid state extrusion, and they have also postulated a model to correlate the flow of instability in extrudate defects to the extrusion temperature and pressure.

Chung in U.S. Pat. No. 5,028,663 teaches that certain blends of high density polyethylene (HDPE) and low density polyethylene (LDPE) prepared by solution mixing can achieve a broader operating window for certain solid state processing applications than would otherwise be achieved by mechanical mixing. The melting peak of each component in the blend is separated due to solution precipitation such that large deformation processing can be performed at a temperature between the melting peaks of the two components.

Pawloski, et al. in U.S. Pat. Nos. 4,352,766, 4,161,502 and 3,739,052 teach a unique process called Solid Phase Forming (SPF) to form polymers and composites at a pre-melt state. This unique fabrication process induces a biaxial orientation throughout the finished parts.

Enikolopow, et al. in U.S. Pat. No. 4,607,797 teach a process called Solid State Sheer Extrusion or Pulverization to perform polymer extrusion at a temperature below the peak melting temperature of the polymer. However, Shutov has observed in a 1992 I.I.T. Research Report that certain polymers, such as HDPE, polypropylene (PP) and polycarbonate (PC) did not perform well in this process.

The disclosures of each of the patents referenced above are incorporated herein by reference.

SUMMARY OF THE INVENTION

According to this invention, polyolefin blends characterized by melting and crystallization curves which exhibit either two distinct melt regions, or a low softening point relative to the high melting component of the blend, provide an unusually wide window for solid state processing. These blends comprise at least 10 percent by weight of the low melting component, and the difference between the peak melting temperature of the low melting component and the high melting component is at least about twenty degrees on the Celsius scale. These blends are processed in their solid state at a temperature above about the peak melting temperature of the low melting component and below the peak melting temperature of the high melting component. The solid state processing characteristics of the blends of this invention are independent of the manner in which the components are mixed, e.g. mechanical, solvent, etc.

DESCRIPTION OF THE PREFERRED EMBODIMENTS

The polyolefin blends of this invention comprise two or more, typically two, polyolefin components. These blends are characterized by having a solid state processing temperature (Tp) defined by $$T_{m1} < T_p < T_{m2}$$

in which the $T_{m2}$ is the peak melting temperature of the high melting component, and $T_{m1}$ is the peak melting temperature of the low melting component. Typically, the difference or range between $T_{m2}$ and $T_{m1}$, i.e. $T_{m2} - T_{m1}$, is greater than about twenty, preferably greater than about thirty, and most preferably greater than about forty, degrees on the Celsius scale.

The components of the blends of this invention are polyolefins, e.g. polyethylenes, polypropylenes, dienes, styrene, etc. Preferred polyolefins are the various polyethylenes and polypropylenes, and preferred blends are those containing at least one polyethylene, particularly a substantially linear ethylene polymer.

The polyethylenes can be divided into two broad classes, heterogeneously branched and homogeneously branched. The heterogeneously branched polyethylenes that can be used in the practice of this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 grams per cubic centimeter (g/cc).

Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and is useful in this invention.

Linear copolymers of ethylene and at least one α-olefin of 3 to 12 carbon atoms, preferably of 4 to 8 carbon atoms, are also well known, commercially available and useful in this invention. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Relevant discussions of both of these classes of materials, and their methods of preparation, are found in U.S. Pat. No. 4,950,541 and the patents to which it refers, all of which are incorporated herein by reference.

The homogeneously branched polyethylenes that can be used in the practice of this invention also fall into two broad categories, the linear homogeneously branched and the substantially linear homogeneously branched. Both are known. The former and their method of preparation are described in U.S. Pat. No. 3,645,992 to Elston, and the latter and their method of preparation are fully described in U.S. Pat. Nos. 5,272,236 and 5,278,272, all of which are incorporated into and made a part of this application by reference. Examples of the former are the Tafmer ™ polymer of Mitsui and the Exact ™ polymer of Exxon, while an example of the latter are the polymers made by the Insite ™ Technology of The Dow Chemical Company.

As here used, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, and more preferably from about 0.05 long-chain branches/1000 carbons to about 1 long-chain branch/1000 carbons. In contrast, simply "linear" means that long chain branching is essentially absent from the polymer backbone. Long-chain branching is here defined as a chain length of at least about 6 carbon atoms, above which the length cannot be distinguished using $^{13}C$ nuclear magnetic resonance spectroscopy, yet the long-chain branch can be about the same length as the length of the polymer backbone.

These unique substantially linear homogeneously branched polymers (subsequently referred to as "substantially linear ethylene polymers") are prepared by using constrained geometry catalysts (CGC), and are characterized by a narrow molecular weight distribution and if an interpolymer, by a narrow comonomer distribution. As here used, "interpolymer" means a polymer of two or more comonomers, e.g. a copolymer, terpolymer, etc. Other basic characteristics of these substantially linear ethylene polymers include a low residuals content (i.e. low concentrations in the substantially linear ethylene polymer of the catalyst used to prepare the polymer, unreacted comonomers, if any, and low molecular weight oligomers made during the course of the polymerization), and a controlled molecular architecture which provides good processability even though the molecular weight distribution is narrow relative to conventional olefin polymers.

While the substantially linear ethylene polymers used in the practice of this invention include substantially linear ethylene homopolymers, preferably these substantially linear ethylene polymers comprise between about 95 and 50 wt % ethylene, and about 5 and 50 wt % of at least one α-olefin comonomer, more preferably 10 to 25 wt % of at least one α-olefin comonomer. Percent comonomer is measured by Infrared Spectroscopy according to ASTM D-2238 Method B. Typically, the substantially linear ethylene polymers are copolymers of ethylene and an α-olefin of 3 to about 20 carbon atoms (e.g. propylene, 1-butene, 1-hexene, 4-methyl-1-pentene, 1-heptene, 1-octene, styrene, etc.), with a density of 0.850 to about 0.960 grams per cubic centimeter (g/cm$^3$), preferably of 0.870 to about 0.910 g/cm$^3$. The melt flow ratio, measured as $I_{10}/I_2$ (ASTM D-1238), is greater than or equal to 5.63, and is preferably from about 6.5 to 15, more preferably from about 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.5 and 2.5. For the substantially linear ethylene polymers, the $I_{10}/I_2$ ratio indicates the degree of long-chain branching, i.e. the larger the $I_{10}/I_2$ ratio, the more long-chain branching in the polymer.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated herein by reference. GER experiments are performed at a temperature of 190° C., at nitrogen pressures between 250 to 5500 psig using about a 7.54 cm diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/CM$^2$. These substantially linear ethylene interpolymers and homopolymers preferably have a PI in the range of about 0.01 kpoise to about 50 kpoise, preferably about 15 kpoise or less, which is less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

An apparent shear stress versus apparent shear rate plot is used to identify the melt fracture phenomena. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." In this disclosure, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear uniformly branched polymer as described by Elston in U.S. Pat. No. 3,645,992) having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g., in blown films and bags therefrom), surface defects should be minimal, if not absent, for good film quality and properties. The critical shear stress at the onset of gross melt fracture for the substantially linear ethylene interpolymers and homopolymers used in making the biaxially oriented, heat-shrinkable film of the present invention is greater than about $4 \times 10^6$ dynes/cm². The critical shear rate at the onset of surface melt fracture (OSMF) and the onset of gross melt fracture (OGMF) will be used herein based on the changes of surface roughness and configurations of the extrudates extruded by a GER.

As here used, "homogeneously branched" means that the comonomer is randomly distributed within a given molecule and that substantially all of the copolymer molecules have the same ethylene/comonomer ratio. The distribution or homogeneity of comonomer branches for the substantially linear ethylene interpolymers and homopolymers is characterized by its SCBDI (Short Chain Branch Distribution Index) or CDBI (Composition Distribution Branch Index), and it is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science, Poly. Phys., Ed.*, Vol. 20, p. 441 (1982), or in U.S. Pat. No. 4,798,081, both disclosures of which are incorporated herein by reference. The SCBDI or CDBI for the substantially linear homogeneously branched interpolymers and homopolymers of the present invention is preferably greater than about 30 percent, especially greater than about 50 percent.

Both the linear homogeneously branched and the substantially linear homogeneously branched ethylene polymers used in this invention have a single melting peak, as measured using differential scanning calorimetry (DSC), in contrast to heterogeneously branched linear ethylene polymers, which have two or more melting peaks due to their broad branching distribution.

The unique characteristic of the homogeneously branched, substantially linear ethylene polymers is a highly unexpected flow property where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

The preferred melt index, measured as $I_2$ (ASTM D-1238, condition 190/2.16 (formerly condition E)), is from about 0.5 g/10 min to 20 g/10 min, more preferably 1 to 5 g/10 min. Typically, the preferred substantially linear ethylene polymers used in the construction of the plastic films used in this practice of this invention are homogeneously branched and do not have any measurable high density fraction, (i.e. short chain branching distribution as measured by Temperature Rising Elution Fractionation which is described in U.S. Pat. No. 5,089,321, and which is incorporated into and made a part of this application by reference), e.g. they do not contain any polymer fraction that has a degree of branching less than or equal to 2 methyl/1000 carbons. These preferred substantially linear ethylene polymers have a single differential scanning calorimetry (DSC) melting peak.

The polypropylene component of this invention, if present, is a homopolymer or one or more copolymers of propylene and up to about 20 mole percent ethylene or other α-olefin having up to about 12 carbon atoms. If a copolymer, it can be random, block or graft. The polypropylene component of this has a typical melt flow rate (as determined by ASTM D-1238, Condition 230/2.16 (formerly Condition L)) of between about 0.1 and 30, and preferably between about 0.8 and 30.

The blends of this invention can also include polyolefins derived from post-consumer recycle (PCR) sources. These materials will vary in composition, but include HDPE derived from milk bottle recycled resin and LLDPE derived from recycled grocery sacks. The PCR resins used in this invention usually have a polyethylene content of at least about 70 wt %, based on the weight of the resin, up to about 100 wt %. The polyethylenes in the PCR resins usually have a melt index between about 0.1 and about 10, and a density between about 0.86 and about 0.97 g/cm³.

Typically, the polyolefin blends of this invention comprise at least about 10 percent, preferably at least about 20 percent and more preferably at least about 30 percent, based on the weight of the blend, of the low melting component. In a preferred embodiment of this invention, the component with the low melting or softening temperature is at least one linear or substantially linear homogeneously branched polyethylene, e.g. at least one of a Tafmer ™, Exact ™ or a polymer made by Insite ™ Technology, or an ethylene-propylene rubber, or an ethylene-propylene-diene monomer terpolymer. More preferably, the low melting temperature component of the blend is a substantially linear homogeneously branched polymer, e.g. a polymer made by Insite ™. In these embodiments, the remainder of the blend comprises one or more, preferably one, heterogeneously branched polyethylene.

The solid state processing temperature of these blends is usually at least about 5, and preferably at least about 10, degrees on the Celsius scale below the peak melting temperature of the blend component with the highest melting temperature, and it is usually at least about 5, preferably at least about 10, degrees on the Celsius scale above the melting or softening temperature of the blend component with the lowest melting or softening temperature.

The polyolefin blends of this invention can be prepared by any one of a number of different methods that ensures a relatively homogenous blend, the particular method employed being a matter of convenience. Illustrative methods include roller milling, extrusion, solvent mixing, and the like. Similarly, the blends can be processed by any conventional solid state technique, e.g. stamping, forging, rolling, extrusion, etc.

The following examples are illustrative of certain specific embodiments of this invention. All parts and percentages are by weight unless otherwise noted.

SPECIFIC EMBODIMENTS

EXAMPLE 1

Sample E-1 is prepared from a 50/50 blend of CGC resin (Sample C-1) and HDPE resin (Sample C-2) using a Haake blender operated for 4 minutes at 180° C. Sample C-5 is prepared in the same manner except that it is prepared from a 50/50 blend of conventional LLDPEs (Samples C-3 and C-4). All the samples except Sample C-1 are subjected to solid state extrusion evaluation by using an Instron Capillary Rheometer (ICR) at 105° C. using a Number 8 die (0.0494 inches in diameter, length-/diameter ratio of 5.10). Sample E-1 (with a $T_p$ of 50 (133-83)) is successfully extruded at a plunger speed of 0.1 inch per minute and at a pressure of 250 psi. The other samples (including Sample C-5 with a $T_p$ of 10 (122-132)) can not be extruded at these conditions, or even at the maximum safe extrusion pressure of the ICR of 4500 psi. These results are reported in Table I.

TABLE I

| Sample # | Composition | MI (g/10 min) | Density (g/cm³) | Peak Melt Temp (C.) | Solid State Extrudable |
| --- | --- | --- | --- | --- | --- |
| E-1 | CGC/HDPE* | 1.33 | 0.926 | — | Yes |
| C-1 | CGC | 1.33 | 0.893 | 83 | NA± |
| C-2 | HDPE | 1.0 | 0.959 | 133 | No |
| C-3 | LLD-3 | 1.0 | 0.920 | 122 | No |
| C-4 | LLD-4 | 2.0 | 0.930 | 122 | No |
| C-5 | LLD-3/LLD-4* | 1.4 | 0.925 | — | No |

*50/50/Blend based on weight.
±NA = Not applicable: above melting point

EXAMPLE 2

The procedures of Example 1 are repeated with different samples (although the composition of Sample C-6 is the same as the composition of Sample C-1). Samples E-2 (a blend of C-6 and C-7) (with a $T_p$ of 51) and E-3 (a blend of C-8 and C-9) (with a $T_p$ of 79) are successfully extruded on the ICR at a plunger speed of 0.1 inch per minute, a pressure of about 2800 psi, a temperature of about 105° C., and using a Number 2 die (0.030 inch, length/diameter ratio of 33.3). Neither the Tafmer TM A-4085 resin nor the polypropylene resin could be extruded at these conditions, or even at the maximum safe extrusion pressure of 4500 psi. The results are reported in Table II.

TABLE II

| Sample # | Composition | MI (g/10 min) | Density (g/cm³) | Peak Melt Temp (C.) | Solid State Extrudable |
| --- | --- | --- | --- | --- | --- |
| E-2 | CGC/HDPE* | 2.33 | 0.926 | — | Yes |
| C-6 | CGC | 1.78 | 0.893 | 83 | NA*** |
| C-7 | HDPE | 10. | 0.962 | 134 | NM± |
| E-3 | Tafmer TM /PP** | 1.4 | 0.925 | — | Yes |
| C-8 | Tafmer TM A-4085 | 1.0 | 0.88 | 88 | No |
| C-9 | PP | 35.0 | — | 167 | No |

*50/50 Blend based on weight.
**30/70 Blend based on weight.
±NM = Not measured.
***NA = Not applicable: above melting point

EXAMPLE 3

The procedures of Example 1 are repeated with different samples. The compositions of Samples C-10 and C-12 are the same. The PCR resin of Sample C-13 is post-consumer recycled grocery sack resin from Advanced Environmental Recycling Technology of Little Rock, Ark., and the PCR resin of Sample C-11 is post-consumer recycled milk bottle resin FR-120 flake from Akron WTE Corp of Akron, Ohio. Both the resins of Samples E-4 (a blend of C-10 and C-11) and E-5 (a blend of C-12 and C-13) (with a $T_p$ of 49) were successfully extruded under the same conditions as those used in Example 2. Neither the resin of C-11 nor the resin of C-13 are extruded under these conditions, and they cannot be extruded under these conditions even at the maximum safe extrusion pressure of 4500 psi. The results are reported in Table III.

TABLE III

| Sample # | Composition | MI (g/10 min) | Density (g/cm³) | Peak Melt Temp (C.) | Solid State Extrudable |
| --- | --- | --- | --- | --- | --- |
| E-4 | CGC/PCR* | — | 0.912 | — | Yes |
| C-10 | CGC | 1.0 | 0.882 | 86 | NA** |

TABLE III-continued

| Sample # | Composition | MI (g/10 min) | Density (g/cm³) | Peak Melt Temp (C.) | Solid State Extrudable |
|---|---|---|---|---|---|
| C-11 | PCR | 0.75 | 0.955 | 132 | No |
| E-5 | CGC/PCR* | 1.4 | 0.935 | — | Yes |
| C-12 | CGC | 1.0 | 0.882 | 86 | NA** |
| C-13 | PCR | 0.4 | 0.962 | 135 | No |

*30/70 Blend based on weight.
**NA — Not applicable: above melting point.

EXAMPLE 4

The procedures of Example 1 are repeated with different samples. Sample C-14 (which is the same as Sample C-3) is a conventional LLDPE with a similar melt index and density as Sample E-6 (a blend of C-16 and C-15) (with a $T_p$ of 107). Both Samples E-6 and C-14 are compression molded into a 125 mil thick plaque according to the procedures of ASTM-1238. The plaques are heated to 65° C., and then compressed in a 40 ton (2075 psi) solid phase forming machine for 3 minutes. The samples are then cooled under the same pressure, removed at room temperature, and the modulus and percent deformation determined. These results are reported in Table IV, and the modulus and percent deformation characteristics of Sample E-6 are clearly superior to those of Sample C-14.

TABLE IV

| Sample # | Composition | MI (g/10 min) | Density (g/cm³) | Peak Melt Temp (C.) | % Deformed | Modulus (psi) |
|---|---|---|---|---|---|---|
| E-6 | HDPE/LD* | 1.01 | 0.922 | — | 203 | 39,900 |
| C-14 | LLD-3 | 1.0 | 0.920 | 122 | 162 | 16,120 |
| C-15 | LD | 1.01 | 0.856 | 26 | NM± | NM± |
| C-16 | HDPE | 1.0 | 0.959 | 133 | NM± | NM± |

*35/65 Blend based on weight.
± NM = Not measured.

Although the invention has been described in considerable detail through the preceding examples, this detail is for illustration purposes only, and it is not to be construed as a limitation on the spirit and scope of the invention as described in the following claims.

What is claimed is:

1. A process for shaping a solid polyolefin blend, the process comprising the steps of:
   A. Heating a solid polyolefin blend which comprises at least a first and second polyolefin, the first of which is a substantially linear homogeneously branched polyethylene characterized as having:
      a) a melt flow ratio, $I_{10}/I_2, \geq 5.63$,
      b) a molecular weight distribution, $M_w/M_n$, defined by the equation:

$$M_w/M_n \leq (I_{10}/I_2) - 4.63, \text{ and}$$

c) a critical shear stress at onset of gross melt fracture of greater than about $4 \times 10^6$ dyne/cm², with a softening temperature of at least about 10 degrees on the Celsius scale lower than the softening temperature of the second polyolefin, the first polyolefin comprising at least about 10 percent of the total weight of the polyolefin blend, the polyefin blend heated to a processing temperature above the softening temperature of the first polyolefin but below the softening temperature of the second polyolefin;
   B. Shaping the blend at the processing temperature; and
   C. Cooling the shaped blend of (B) to a temperature below the processing temperature.

2. The process of claim 1 in which the second polyolefin is at least one of high density polyethylene, low density polyethylene, linear low density polyethylene, and ultra low density polyethylene.

3. The process of claim 2 in which the first polyolefin comprises at least about 20 percent of the total weight of the polyolefin blend.

4. The process of claim 3 in which the process temperature is a temperature of at least about 5 degrees on the Celsius scale lower than the softening temperature of the first polyolefin, and at least about 5 degrees on the Celsius scale higher than the softening temperature of the second polyolefin.

5. The process of claim 3 in which the processing temperature is at least about 10 degrees on the Celsius scale lower than the softening temperature of the second polyolefin, and at least about 10 degrees higher than the softening temperature of the first polyolefin.

6. The process of claim 5 in which the polyolefin blend is prepared by mechanically mixing the first and second polyolefins with one another.

* * * * *

UNITED STATES PATENT AND TRADEMARK OFFICE
CERTIFICATE OF CORRECTION

PATENT NO. : 5,408,004
DATED : April 18, 1995
INVENTOR(S) : Lai et al.

It is certified that error appears in the above-indentified patent and that said Letters Patent is hereby corrected as shown below:

Column 4, line 44, "$M_wM_n \leq (I_{10}/I_2) - 4.63$" should be replaced by -- $M_w/M_n \leq (I_{10}/I_2) - 4.63$ --.

Column 5, line 60, "*phys,*" should be replaced by -- *phys.* --.

Claim 4, line 4, "first" should be replaced by -- second --.

Claim 4, line 6, "second" should be replaced by -- first --.

Signed and Sealed this

Fifteenth Day of April, 1997

*Attest:*

BRUCE LEHMAN

*Attesting Officer*  *Commissioner of Patents and Trademarks*